(12) United States Patent
Sun et al.

(10) Patent No.: US 10,169,674 B2
(45) Date of Patent: Jan. 1, 2019

(54) VEHICLE TYPE RECOGNITION METHOD AND FAST VEHICLE CHECKING SYSTEM USING THE SAME METHOD

(71) Applicant: NUCTECH COMPANY LIMITED, Beijing (CN)

(72) Inventors: Shangmin Sun, Beijing (CN); Yanwei Xu, Beijing (CN); Qiang Li, Beijing (CN); Weifeng Yu, Beijing (CN); Yu Hu, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 16/022,666

(22) Filed: Jun. 28, 2018

(65) Prior Publication Data

US 2018/0322358 A1    Nov. 8, 2018

Related U.S. Application Data

(62) Division of application No. 14/972,106, filed on Dec. 17, 2015.

(30) Foreign Application Priority Data

Dec. 17, 2014    (CN) .......................... 2014 1 0780221

(51) Int. Cl.
*G06K 9/00* (2006.01)
*G06K 9/32* (2006.01)
*H04N 5/33* (2006.01)
*G06K 9/20* (2006.01)

(52) U.S. Cl.
CPC ....... *G06K 9/3241* (2013.01); *G06K 9/00201* (2013.01); *G06K 9/00771* (2013.01); *G06K 9/209* (2013.01); *H04N 5/33* (2013.01)

(58) Field of Classification Search
None
See application file for complete search history.

(56) References Cited

U.S. PATENT DOCUMENTS

| 6,278,798 B1 * | 8/2001 | Rao ...................... G06K 9/6211 |
| | | 382/154 |
| 9,683,836 B2 * | 6/2017 | Sandhawalia .......... G01B 11/24 |
| 2013/0182908 A1 * | 7/2013 | Nishimura ............... G06K 9/78 |
| | | 382/104 |

* cited by examiner

*Primary Examiner* — Vikkram Bali
(74) *Attorney, Agent, or Firm* — Kilpatrick Townsend & Stockton LLP

(57) ABSTRACT

A vehicle type recognition method based on a laser scanner is provided, the method comprising steps of: detecting that a vehicle to be checked has entered into a recognition area; causing a laser scanner to move relative to the vehicle to be checked; scanning the vehicle to be checked using the laser scanner on a basis of columns, and storing and splicing data of each column obtained by scanning to form a three-dimensional image of the vehicle to be checked, wherein a lateral width value is specified for each single column of data; specifying a height difference threshold; and determining a height difference between the height at the lowest position of the vehicle to be checked in data of column N and the height at the lowest position of the vehicle to be checked in data of specified number of columns preceding and/or succeeding to the column N.

8 Claims, 1 Drawing Sheet

VEHICLE TYPE RECOGNITION METHOD AND FAST VEHICLE CHECKING SYSTEM USING THE SAME METHOD

PRIORITY CLAIM

This application is a divisional application of U.S. patent application Ser. No. 14/972,106, entitled VEHICLE TYPE RECOGNITION METHOD AND FAST VEHICLE CHECKING SYSTEM USING THE SAME METHOD, filed Dec. 17, 2015, which is incorporated herein in its entirety for any and all purposes.

TECHNICAL FIELD

This invention relates to a vehicle type recognition method and a fast security checking system of a vehicle, particularly to a vehicle type recognition method based on a laser scanner and a fast vehicle checking system using the same method.

BACKGROUND OF THE INVENTION

In the field of vehicle security checking, one of the present trends is to check container trucks and other various types of trucks without parking, thereby greatly improving security checking efficiency. In this case, it is necessary for drivers to drive vehicles through a radiation exposure region. As a result, it can cause great damage to the health of the drivers due to the high energy level or radiation dose of general accelerators or radiation sources. Thus, it is very important how to accurately recognize cabs where the drivers locate (the truck head portion) so that radiation sources may be controlled to perform no radiation or low level radiation on the cabs.

Cab recognition methods currently used in the field of security checking comprise adopting various sensors such as photoelectric switches or light curtains to recognize the type of vehicle, i.e., to recognize the head portion of the vehicle. Determining vehicle type using photoelectric switches is a determination based on blocking relationship of light beams, which requires a transmitting device and a receiving device, and thus occupies a larger area for mounting at fixed stations and cannot be mounted on vehicles for mobility.

Current vehicle type recognition is generally achieved by recognizing a gap portion between the head portion and the subsequent cargo portion of a vehicle using infrared photoelectric switches, induction coils or light curtains. For container trucks, the gap portion refers to a gap up to 1 meter between the head portion and the cargo portion of the vehicle; for van trucks, it refers to a gap about merely tens of centimeters or several centimeters between the head portion and the cargo portion of the vehicle; for some "single frame trucks", it refers to merely a recess portion between the head portion and the cargo portion of the vehicle. Due to different types of vehicles, there may be different connection structures, distances and relative heights between the head portion and the subsequent cargo portion of the vehicle, leading to different gap portions accordingly. Thus, only using the single photoelectric switches or light curtains, it is difficult to accurately determine whether the ON or OFF of a light path indicates the true gap between the head portion and the cargo portion of vehicle or some other intervals, even causing a case in which windows may be recognized as the gap portion between head portion and the cargo portion of the vehicle. This usually causes errors in the recognition of positions of the head portion and the cargo portion of the vehicle using photoelectric switches or even two-dimensional images, putting drivers in danger or making radiation scanning area on images incomplete or inaccurate. For example, because there are windows in the cab, if a photoelectric switch is provided at such a height that a light beam passes the head portion of the vehicle through the open windows of the cab so as to arrive at a receiver opposite to the photoelectric switch, a controller may determines by mistake that the head portion of the vehicle has passed and thus turns on a radiation source. However, at this time, the head portion of the vehicle has not yet passed through the radiation scanning area in fact and this misoperation may bring great danger to drivers.

Thus, there is a need to provide a method and a system for recognizing the type of vehicle rapidly and accurately, which may rapidly and accurately distinguish the head portion and the cargo portion of a vehicle, so that a radiation source may be controlled accurately to emit radiations at an appropriate dose when it is necessary to emit radiations.

SUMMARY OF THE INVENTION

A first aspect of this invention is to provide a vehicle type recognition method based on a laser scanner, the method comprising steps of: detecting that a vehicle to be checked has entered into a recognition area; causing a laser scanner to move relative to the vehicle to be checked; scanning the vehicle to be checked using the laser scanner on a basis of columns, and storing and splicing data of each column obtained by scanning to form a three-dimensional image of the vehicle to be checked, wherein a lateral width value is specified for each single column of data; specifying a height difference threshold; and determining a difference between the height at the lowest position of the vehicle to be checked in data of column N and the height at the lowest position of the vehicle to be checked in data of specified numbers of columns preceding and/or succeeding to the column N, if the absolute value of the height difference is larger than the specified height difference threshold, labeling a position of the vehicle to be checked corresponding to the data of the column N as a start position of a gap portion of the vehicle to be checked, a length corresponding to data of the first N columns being the length of the head portion of the vehicle to be checked in the three-dimensional image.

A second aspect of this invention is to provide a fast vehicle type recognition system, comprising: a radiation scanning and imaging device comprising a radiation source for generating radiations and a detection device for receiving radiations passing through a vehicle to be checked, wherein the radiation source images the vehicle to be checked by emitting radiations towards the target to be checked; a laser scanner for recognizing the type of a vehicle to be checked according to the vehicle type recognition method provided in the first aspect of this invention to distinguish a first portion and a second portion of the vehicle to be checked which are separated by a gap portion; and a control device for controlling the radiation source based on a signal from the laser scanner to emit radiations to irradiate the vehicle to be checked, wherein when the first portion of the vehicle to be checked enters into a radiation scanning region, the control device controls the radiation source to scan with a first dose; when the second portion of the vehicle to be checked enters into the radiation scanning region, the control device controls the radiation source to scan with a second dose.

With the method and the system of this invention, the gap portions may be readily recognized for various types of vehicles, so that the head portion and the cargo portion of the vehicle may be distinguished accurately, and thereby the radiation source may be controlled precisely to emit an appropriate dose of radiations when it is necessary to emit radiations.

BRIEF DESCRIPTION OF THE DRAWINGS

For a thorough understanding of this invention, the following description will be given with reference to the accompanying drawings, wherein.

DETAILED DESCRIPTION OF THE PREFERRED EMBODIMENT

For a more clear understanding of the technical problem to be solved in this invention, its technical solution and advantages, various exemplary embodiments of the present invention will now be described in detail with reference to the drawings.

Vehicle type recognition discussed in this invention refers to the recognition of trucks with cargos, trucks without cargos, container trucks and buses. The vehicle type recognition according to this invention refers to determining the type of vehicle such as container trucks, van trucks, ordinary trucks and buses by recognizing a gap portion between a first portion such as the head portion (the cab) and a second portion such as the cargo of a vehicle body. Although both trucks and container trucks have cargos, different types of vehicles have different distances between the cargo portion and the head portion and different cargo heights, thus container trucks and different types of trucks may be distinguished by recognizing the gap portion. In the recognition of the gap portion, among data of each laser beam (i.e., each column) of the laser scanner and data of its specified preceding and/or succeeding columns, a determination is made by comparing the heights of the lowest positions of the vehicle body contained in the column data.

The laser scanner emits a column of light beam each time. During a scanning procedure, the movement direction of the scanning light beam is always perpendicular to the column direction of the light beam. Therefore, after scanning a segment of space by the laser scanner, a three-dimensional image of the scanned space is shown on a detector. Because the three-dimensional image contains information of grey scale and depth and can reflect abundant hierarchical information, information in the three-dimensional image generated by the laser scanner is much more than information in a two-dimensional image and is superior to ON/OFF signals of photoelectric switches. During the process of scanning a vehicle to be checked with a laser scanner, if the scan speed is fast enough (faster than the travelling speed of the vehicle), a three-dimensional image of the vehicle may be obtained through scanning by the laser scanner, including a head portion, a cargo portion and above all a gap portion of the vehicle. The gap portion may be readily recognized with human visual recognition or computer image recognition, so that the head portion of the vehicle may be accurately distinguished from the cargo portion of the vehicle, and in turn the radiation source may be controlled precisely to emit an appropriate dose of radiations when it is necessary to emit radiations.

Figure 1:
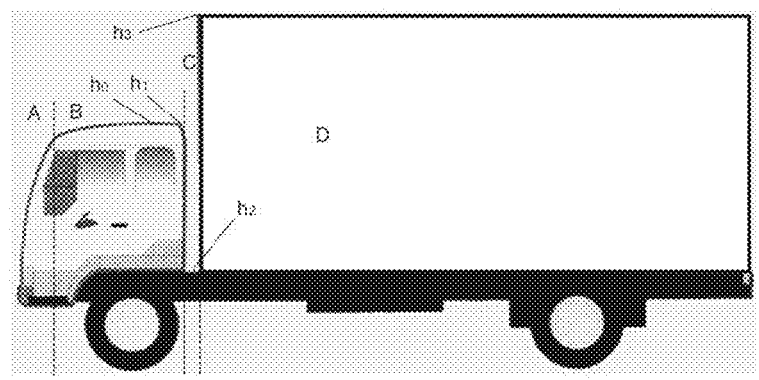
FIG. 1 shows a schematic diagram of the recognition of a van truck according to an embodiment of this invention.

FIG. 1 shows a schematic diagram of the recognition of a van truck according to an embodiment of this invention. As shown in FIG. 1, in this embodiment, the type of the vehicle to be checked is van truck, which includes a head portion comprising a region A and a region B, a gap portion C comprising a region C and a cargo portion comprising a region D. During the recognition of the vehicle to be checked, a laser scanner (not shown) moves relative to the vehicle to be checked. Depending on different implementations, either a travelling vehicle to be checked passes through a static laser scanner, for example, a laser scanner for recognizing the type of vehicles driving on roads, or the laser scanner moves while the vehicle to be checked is static, for example, recognizing the type of vehicles parked in a parking lot using a laser scanner. When a vehicle to be checked is detected to enter into a recognition area, the laser scanner is caused to move relative to the vehicle to be checked. Depending on different implementations, the entering of a vehicle to be checked into the recognition area may be identified using photoelectric switches, light curtains, laser sensors, radar sensors, speed measuring radars or even the laser scanner itself. Particularly, for example, a speed measuring radar may be used to continuously measure a speed of the vehicle to be checked relative to the laser scanner.

The vehicle to be checked is scanned on a basis of column using the laser scanner, and data of each column obtained by scanning is stored and spliced to form a three-dimensional image of the vehicle to be checked. Because the laser scanner firstly performs fast longitudinal scanning along the column direction (because the speed of column scanning is very fast, it may be considered that a column of data is obtained every time the column scanning), then a horizontal scanning is performed along a direction perpendicular to the column direction in the same manner as the column scanning, so that data of each column obtained by scanning may be spliced sequentially to form a complete image. Because the laser scanner can scan the depth hierarchical information of the object to be checked and can present it in the form of greyscale images, a three dimensional image can be obtained by splicing them. Generally, the spliced three dimensional image is obtained through data splicing performed by a control device or an image processing device in such a manner that once a column of data is received it is spliced immediately, or splicing may be performed together after a specified amount of data is received (for example, once 50 columns of data is received). Then, a lateral width value is specified for a single column of data.

A difference between the height at the lowest position of the vehicle to be checked in data of the column N and the height at the lowest position of the vehicle to be checked in data of a specified column preceding and/or succeeding to the column N is determined. If the absolute value of the height difference is larger than the specified height difference threshold, a position of the vehicle to be checked corresponding to the data of the column N is labeled as a start position of a gap portion of the vehicle to be checked, and a length corresponding to data of the first N columns is the length of the head portion of the vehicle to be checked in the three-dimensional image. The height at the lowest position of the vehicle body in data of each column refers to a vertical distance between the highest position of the vehicle body and a specified uniform reference baseline (such as the horizontal ground or the chassis of the vehicle).

Particularly, as shown in FIG. 1, when the vehicle to be checked is detected to enter into a recognition area, the laser scanners tarts to scan the vehicle to be checked and collect data. Generally, the laser scanner performs laser scanning on the vehicle to be checked at a frequency of 100 Hz (i.e., 100 columns per second). Certainly, a scan frequency of 200 Hz or other scanning frequencies may be adopted. When the laser scanner scans a first portion of the vehicle to be checked (generally, scanning from the head of the vehicle, in this case the first portion refers to the head portion of the vehicle), the laser scanner may sequentially scan through four regions A, B, C and D as shown in FIG. 1. If there is a sudden change in the height at the lowest position of the vehicle body, it is generally considered that a gap portion is identified. Thus, heights of the lowest positions in a current column and a predetermined column preceding and/or succeeding to the current column (for example, the first column or the fifth column before or after the current column) are compared, and a height difference threshold is specified. The height difference is compared with the height difference threshold. If the height difference is smaller than the specified height difference threshold (such as 2 cm), it is considered that the lowest height at a position of a vehicle body corresponding to the data of this column continuously changes from the lowest heights at adjacent positions of the vehicle body; if the height difference is larger than the specified height difference threshold, it is considered that the lowest height at a vehicle position corresponding to the data of this column suddenly changes from the lowest heights at adjacent positions of the vehicle body. In FIG. 1, when the laser scanner scans regions A and B, it may be found with naked eyes that the height at the lowest position in the data of each column has a very small height difference from the heights at the lowest positions in the data of its preceding and succeeding columns (a threshold is determined unconsciously by human beings, although no explicit value is specified for the threshold, there is a sense of an order of magnitudes, for example, a height difference in the millimeter range may be considered as a continuous change in height, and a discontinuous height transition with sudden changes may be determined as a gap portion). From this three-dimensional image, it is determined whether the gap portion is arrived, the size of the gap portion, the height of the rear portion and comprehensive shape features of the vehicle body, i.e., the type of the vehicle may be determined through human visual recognition. In addition to human visual recognition, the gap portion may be recognized using a computer algorithm. For example, when the laser scanner scans column N as shown in FIG. 1 (the last column in the region B scanned by the laser scanner, which is also the first column in the region C), it is assumed that the height at the lowest position as shown in the data of column N is h1=200 cm, while the height at the lowest position as shown in the data of a succeeding column such as column N+1 (or N+5) in the region C is h2=130 cm, and the height at the lowest position as shown in the data of a preceding column such as column N−5 in the region B is h0=199 cm, a difference value $\Delta h=|h1-h0|=1$ cm<2 cm is obtained by comparing the heights at two lowest positions of columns N and N−5. Another difference value $\Delta h'=|h2-h1|=70$ cm>>2 cm is obtained by comparing the heights at two lowest positions of columns N and N+1, which is larger than the specified height difference threshold. At the same time, the heights of the first N columns are all in a range of height reasonable for the head portion of the vehicle, for example, from 1.5 to 3.5 meters, the spliced length of the data of the first N columns is in a range reasonable for the length of the head portion of the vehicle, for example, from 1.5 to 3 meters, and a contour spliced from the data of the first N columns complies with a contour of the head portion of the vehicle, an overall determination may be made that a gap portion has been found by scanning.

Vertical information of the vehicle may be directly obtained from the column data. After horizontal restoration of the three-dimensional image, a width corresponding to a single column data in the three-dimensional image is randomly determined. By calculating the number of data columns from the head portion of the vehicle to the gap portion, a length of the head portion of the vehicle is obtained. In one embodiment, horizontal restoration of the three-dimensional image may be performed based on a speed measured by a speed measuring radar. Particularly, a restoration scale curve is provided according to the measured relative movement speed. By restoring the length of the head portion of the vehicle and the length of the gap portion in the three-dimensional image using the restoration scale curve, the actual length of the head portion of the vehicle and the length of the gap portion are calculated. Further, by comparing the calculated actual length of the head portion of the vehicle and the length of the gap portion with vehicle type information in a vehicle type database, the type of the vehicle to be checked is obtained. As shown in FIG. 1, the restoration scale curve depends on a particular speed corresponding to the collection frequency of the laser scanner. Using the measured speed, data collected from the vehicle to be checked is supplemented through fitting or may be discarded. When the measured speed is larger than the particular speed described above, data in this time period must be supplemented through fitting. The larger the difference is, the more data is required to be supplemented through fitting. When the measured speed is smaller than the particular speed described above, some data in this time period must be discarded. The larger the difference is, the more data is required to be discarded. When the measured speed is equal to the particular speed described above, it is not necessary to perform any process on the data in this time period.

In a preferred embodiment, an initial number of recognition columns may be specified, and the step of determining height difference is started only when data of columns after the initial number of recognition columns has been scanned. For example, in the embodiment as shown in FIG. 1, an initial number of recognition columns k is specified as 1000, and from data of column 1001, the imaging of the three-dimensional image is performed using data of column 1001. This is for the purpose of avoiding calculation for a non-gap portion at the front of the vehicle that is estimated empirically or theoretically, so that computing load of the system may be reduced and the probability of errors may be decreased.

Figure 2:
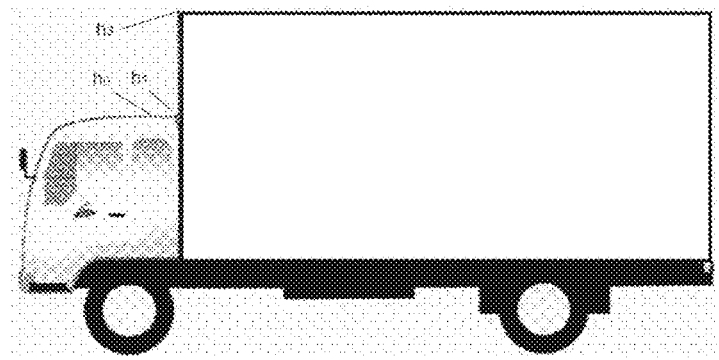
FIG. 2 shows a schematic diagram of the recognition of a single frame truck according to another embodiment of this invention.

FIG. 2 shows a schematic diagram of the recognition of a single frame truck according to another embodiment of this invention. In this embodiment, the type of the vehicle to be checked is single frame truck. As shown in FIG. 2, the gap portion of the single frame truck is merely a recess portion between the head portion and the cargo portion of the vehicle.

Similar to the embodiment as shown in FIG. 1, in FIG. 2, when the vehicle to be checked is detected to enter into a recognition area, a laser scanner (not shown) moves relative to the vehicle to be checked, and the laser scanner begins to scan and collect data from the vehicle to be checked. Generally, the laser scanner scans a laser light on the vehicle to be checked at a scanning frequency of 100 Hz (i.e., 100 columns per second). Certainly, a scanning frequency of 200 Hz or other scanning frequencies may be also adopted. When a first portion of the vehicle to be checked is scanned by the laser scanner (in general, scanning from the head of the vehicle, in this case the first portion refers to the head portion of the vehicle), the laser scanner will sequentially scan a first portion and a second portion, the first portion including the head portion of the vehicle and the second portion including the cargo portion of the vehicle as shown in FIG. 2.

In FIG. 2, after column N indicating a gap portion between the first portion and the second portion of the vehicle to be checked has been scanned, a height difference between the height at the lowest position of the vehicle to be checked in the data of column N and the height at the lowest position of the vehicle to be checked in the data of specified numbers of columns preceding and/or succeeding to the column N. If the absolute value of the height difference is larger than a specified height difference threshold, a position of the vehicle to be checked corresponding to the data of column N is labeled as a start position of the gap portion of the vehicle to be checked, and a length corresponding to the data of the first N columns is considered as the length of the head portion of the vehicle to be checked in the three-dimensional image. For example, when column N as shown in FIG. 2 is scanned by the laser scanner (at the last column in the head region of the vehicle scanned by the laser scanner, which is also a first column in the gap portion), it is assumed that the height of the lowest position as shown in the data of column N is h1=200 cm, the height of the lowest position as shown in the data of a succeeding column such as column N+5 in the cargo portion of the vehicle is h3=300 cm, and the height of the lowest position as shown in the data of a preceding column such as column N−5 in the head portion of the vehicle is h0=199 cm, a difference $\Delta h=|h1-h0|=1$ cm<2 cm is obtained by comparing the heights at two lowest positions at columns n and n−5, and a difference $\Delta h'=|h3-h1|=100$ cm>>2 cm is obtained by comparing the heights at two lowest positions at columns n and n+5, which is larger than the specified height difference threshold. At the same time, the heights of the data of the first N columns are all in a range of height reasonable for the head portion of the vehicle, for example, from 1.5 to 3.5 meters, the spliced length of the data of the first N columns is in a range reasonable for the length of the head portion of the vehicle, for example, from 1.5 to 3 meters, and a contour spliced from the data of the first N columns complies with a contour of the head portion of the vehicle, an overall determination may be made that a gap portion has been found by scanning.

According to the determined gap portion, by recognizing information for distinguishing the first portion and the second portion of the vehicle to be checked in the three-dimensional image, the first portion and the second portion of the vehicle to be checked are distinguished. Then, the radiation source is controlled to irradiate the first portion of the vehicle to be checked with a first dose, and the radiation source is controlled to irradiate the second portion of the vehicle to be checked with a second dose. When the vehicle to be checked exits the radiation scanning region, the scanning of the laser scanner and the irradiation of the radiation source are stopped. The first portion of the vehicle to be checked may be a portion to be protected and the second portion of the vehicle to be checked may be a portion for which no protection is needed. The first dose of the radiation source may be a low dose and the second dose of the radiation source may be a high dose, wherein the low dose comprises a dose of zero.

The vehicle type recognition method based on a laser scanner discussed above in this invention may be applied to various fast vehicle checking systems. In a particular embodiment, a fast vehicle checking system comprises a radiation scanning and imaging device comprising a radiation source for generating radiations and a detection device for receiving radiations passing through a vehicle to be checked, wherein the radiation source images the vehicle to be checked by emitting radiations towards the target to be checked. The fast vehicle checking system further comprises a laser scanner for recognizing the type of a vehicle to be checked according to the vehicle type recognition method discussed above, so as to distinguish a first portion and a second portion separated by a gap portion, the first portion comprising the head portion of the vehicle and the second portion comprising the cargo portion of the vehicle. The fast vehicle checking system further comprises a control device for controlling the radiation source based on a signal from the laser scanner to emit radiations to irradiate the vehicle to be checked, wherein when the first portion of the vehicle to be checked enters into a radiation scanning region, the control device controls the radiation source to scan with a first dose; when the second portion of the vehicle to be checked enters into the radiation scanning region, the control device controls the radiation source to scan with a second dose.

In embodiments of this invention, distinguishing the first portion and the second portion of the vehicle to be checked may be performed manually or using a computer algorithm program. In other embodiments, the fast vehicle checking system further comprises a photoelectric switch, which is used to detect that a vehicle to be checked has entered into the radiation scanning region. The fast vehicle checking system further comprises a speed measuring radar, which is used to detect that a vehicle to be checked has entered into the radiation scanning region. After the vehicle to be checked has entered into the radiation scanning region, the speed measuring radar monitors the speed of the vehicle to be checked and provides a feedback to the control device, so as to control the scanning speed of the laser scanner and/or control the irradiation frequency of the radiation source. After the vehicle to be checked has exited the radiation scanning region, the scanning of the laser scanner and the irradiation of the radiation source are stopped.

Those as disclosed above are merely some specific embodiments of the present invention, but the present invention is not restricted thereto, those skilled in the art may make various modifications and variations to the present invention without departing from the spirit or scope of the invention. Obviously, all modifications conceivable to those skilled in the art should fall within the protection scope of the present invention.

What is claimed is:

1. A fast vehicle type recognition system, comprising:
   a radiation scanning and imaging device comprising a radiation source for generating radiations and a detection device for receiving radiations passing through a vehicle to be checked, wherein the radiation source images the vehicle to be checked by emitting radiations towards the target to be checked;
   a laser scanner for recognizing the type of the vehicle to be checked to distinguish a first portion and a second portion of the vehicle to be checked which are separated by a gap portion; and
   a control device for controlling the radiation source based on a signal from the laser scanner to emit radiations to irradiate the vehicle to be checked, wherein when the first portion of the vehicle to be checked enters into a radiation scanning region, the control device controls the radiation source to scan with a first dose; when the second portion of the vehicle to be checked enters into the radiation scanning region, the control device controls the radiation source to scan with a second dose, wherein the laser scanner is configured to detect that the vehicle to be checked has entered into a recognition area;

move relative to the vehicle to be checked;

scan the vehicle to be checked on a basis of columns, and storing and splice data of each column obtained by scanning to form a three-dimensional image of the vehicle to be checked, wherein a lateral width value is specified for each single column of data;

specify a height difference threshold;

determine a height difference between the height at the lowest position of the vehicle to be checked in data of column N and the height at the lowest position of the vehicle to be checked in data of specified numbers of columns preceding and/or succeeding to the column N, if the absolute value of the height difference is larger than the specified height difference threshold;

the heights at the lowest position of the vehicle to be checked in data of the first N columns are all in a first predetermined range;

a length corresponding to data of the first N columns is in a second predetermined range; and a contour spliced from the data of the first N columns complies with one of predetermined contours of head portions of vehicles, label a position of the vehicle to be checked corresponding to the data of the column N as a start position of a gap portion of the vehicle to be checked, the length corresponding to data of the first N columns being the length of the head portion of the vehicle to be checked in the three-dimensional image.

2. The fast vehicle type recognition system of claim 1, wherein distinguishing the first portion and the second portion of the vehicle to be checked is performed manually or using a computer algorithm program.

3. The fast vehicle type recognition system of claim 2, wherein the laser scanner is further used to detect that a vehicle to be checked has entered into the radiation scanning region.

4. The fast vehicle type recognition system of claim 2, further comprising a photoelectric switch for detecting that a vehicle to be checked has entered into the radiation scanning region.

5. The fast vehicle type recognition system of claim 2, further comprising a speed measuring radar for detecting that a vehicle to be checked has entered into the radiation scanning region.

6. The fast vehicle type recognition system of claim 5, wherein after the vehicle to be checked has entered into the radiation scanning region, the speed measuring radar monitors the speed of the vehicle to be checked and provides a feedback to the control device, so as to control the scanning speed of the laser scanner and/or control the irradiation frequency of the radiation source.

7. The fast vehicle type recognition system of claim 1, wherein the first portion of the vehicle to be checked is a portion to be protected and the second portion of the vehicle to be checked is a portion for which no protection is needed; the first dose of the radiation source is a low dose and the second dose of the radiation source is a high dose.

8. The fast vehicle type recognition system of claim 7, wherein the low dose comprises a dose of zero; and/or the portion to be protected is the head portion of the vehicle.

* * * * *